W. DALE.

Assignor, by mesne assignments, to the DALE TILE MANUFACTURING CO.,—(Limited.)

Illuminating Vault-Cover.

No. 8,295. Reissued June 25, 1878.

Witnesses:

Theodore H. Mosten

B. S. Clark

Inventor:

William Dale by H. Ketch his Atty.

N. PETERS, PHOTO-LITHOGRAPHER, WASHINGTON, D. C.

UNITED STATES PATENT OFFICE.

WILLIAM DALE, OF NEW YORK, N. Y., ASSIGNOR, BY MESNE ASSIGNMENTS, TO THE DALE TILE MANUFACTURING COMPANY, (LIMITED,) OF SAME PLACE.

IMPROVEMENT IN ILLUMINATING VAULT-COVERS.

Specification forming part of Letters Patent No. 112,428, dated March 7, 1871; Reissue No. 5,684, dated December 16, 1873; Reissue No. 8,295, dated June 25, 1878; application filed May 22, 1878.

*To all whom it may concern:*

Be it known that I, WILLIAM DALE, of the city, county, and State of New York, have invented a new and useful Improvement in Covers for Openings in Sidewalks; and I do hereby declare that the following is a full, clear, and exact description of the same, reference being had to the annexed drawings, making part of this specification, in which—

Figure 1:
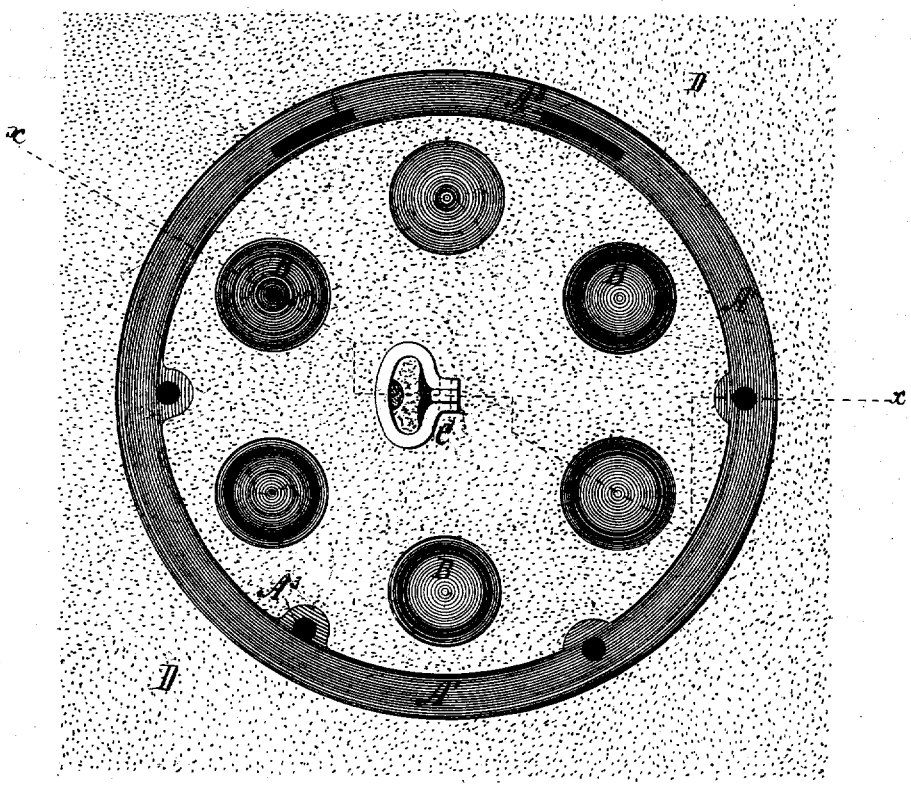
Figure 2:
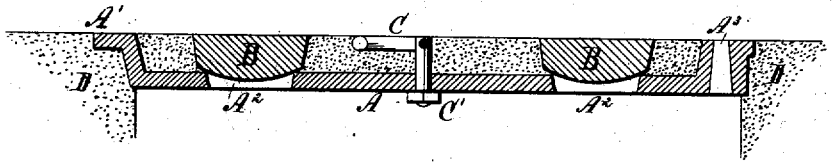

Figure 1 is a plan view, and Fig. 2 is a vertical section on the line *x x* of Fig. 1.

The same letters are employed in both the figures in the indication of identical parts.

This invention relates to such covers as are used for covering openings into vaults; and my improvement consists in making the surface of the cover within the metallic rim of a material which is not slippery, inclosing glass bull's-eyes, fitted over holes in the metallic dish, and held in place by the surrounding material, the bull's-eye being thus set and held directly in and by the body of the said material and forming a tight joint therewith; also, in forming holes through the metallic rim, when it is desirable that such a cover should have openings for ventilation.

Such illuminating vault-covers have heretofore been made by using a frame of cast-iron, with cross-bars, like a window sash. Bull's-eyes were then inserted in the openings, and secured in place by a suitable plastic material, filling the narrow spaces between the bars and the glass bull's eyes. The bars were flush with the surface of the glass, and liable to become polished from use, and thus afford an insecure foot-hold. Besides this, the iron expanding more than the glass when exposed to the heat of the sun, the bull's-eyes are liable to be crushed or forced out of their places.

To remedy the defects of the covers in former use, I use a dish, of cast-iron or other suitable metal, A, formed with a peripheral flange, $A^1$, to bear upon a seat formed in the pavement D. Holes at proper intervals, $A^2$, are formed to receive glass bull's-eyes B. These bull's-eyes are held in place by an intermediate filling, C, substantially occupying the space between the bull's-eyes and the vertical rim of the dish, (so that no part of the latter is exposed at the surface of the pavement except the annular rim $A^1$.) This filling may be of such materials as are employed in making pavements, forming a tight joint with the bull's-eyes, and constituting with them substantially the surface of the said covering.

A ring, C, attached to an eyebolt, C′, may be countersunk, so that when not in use it will be flush with the surface of the material used in filling the space between the bull's-eyes. For purposes of ventilation, openings, as at $A^3$, may be formed through the vertical portion of the dish.

What I claim as my invention, and desire to secure by Letters Patent, is—

1. A vault-cover consisting of a metallic dish, A, having holes in the bottom plate $A^2$, bull's-eye B, placed in said holes, and a non-slippery filling material, described, which forms substantially the upper surface of the cover within the rim $A^1$, and in which the bull's-eyes are set and held. the said material forming a water-tight joint with the bull's-eyes, all as specified.

2. The illuminated vault-cover described, provided with openings $A^3$, for ventilation, through the rim $A^2$ of the cover A, as specified.

WILLIAM DALE.

Witnesses:
B. S. CLARK,
A. S. FITCH.